United States Patent [19]

Froberg

[11] 3,944,686
[45] Mar. 16, 1976

[54] METHOD FOR VAPOR DEPOSITING PYROLYTIC CARBON ON POROUS SHEETS OF CARBON MATERIAL

[75] Inventor: Robert W. Froberg, Easton, Pa.

[73] Assignee: Pfizer Inc., New York, N.Y.

[22] Filed: June 19, 1974

[21] Appl. No.: 480,922

[52] U.S. Cl. ............... 427/228; 118/48; 118/49; 427/249; 427/122; 427/289; 427/294
[51] Int. Cl.² .................. C01B 31/04; C23C 11/00
[58] Field of Search ..... 117/106 C, 106 R, DIG. 11, 117/46 CG, 226, 228; 427/228, 249, 122, 289, 294; 118/48, 49

[56] References Cited
UNITED STATES PATENTS

| | | | |
|---|---|---|---|
| 3,317,338 | 5/1967 | Batchelor | 117/106 R |
| 3,379,555 | 4/1968 | Hough | 117/106 C |
| 3,692,565 | 9/1972 | Lersmacher et al. | 117/106 C |
| 3,725,110 | 4/1973 | Rodgers et al. | 117/106 C |
| 3,829,327 | 8/1974 | Omori et al. | 117/106 R |

Primary Examiner—Ralph S. Kendall
Assistant Examiner—John D. Smith
Attorney, Agent, or Firm—Connolly and Hutz

[57] ABSTRACT

An elongated continuous porous sheet of fibrous carbon, such as paper of matted graphite fibers, woven graphite cloth or carbonized filter paper is longitudinally traversed through a reduced pressure heating zone (5 mm. of Hg.) in which hydrocarbon gas is perpendicularly directed at relatively high velocities through restricted flow passages at the sheet, which is heated to a temperature of about 2200°C. The sheets are traversed at a speed of about 60 to 3600 feet per hour at a temperature of about 2000° to 2400°C at a pressure of from about 4 to 20 mm. Hg. A hydrocarbon gas, at a flow rate of from about 5 to 20 c.f.m. effectively infiltrates the carbon sheet material and increases the sheet density by at least 20 grams per square meter. The velocity of the carbon depositing flow stream is maintained at from about 20 to 200 ft. per minute (STP).

11 Claims, 12 Drawing Figures

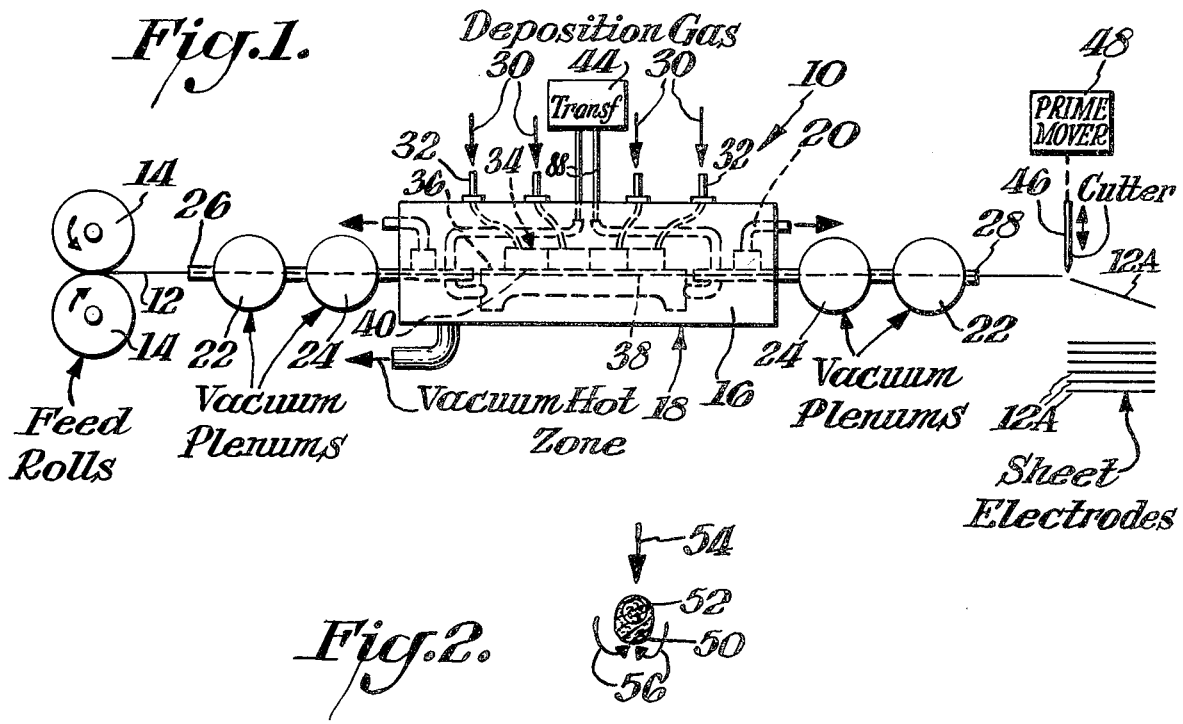
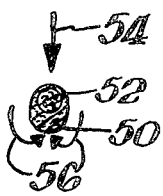
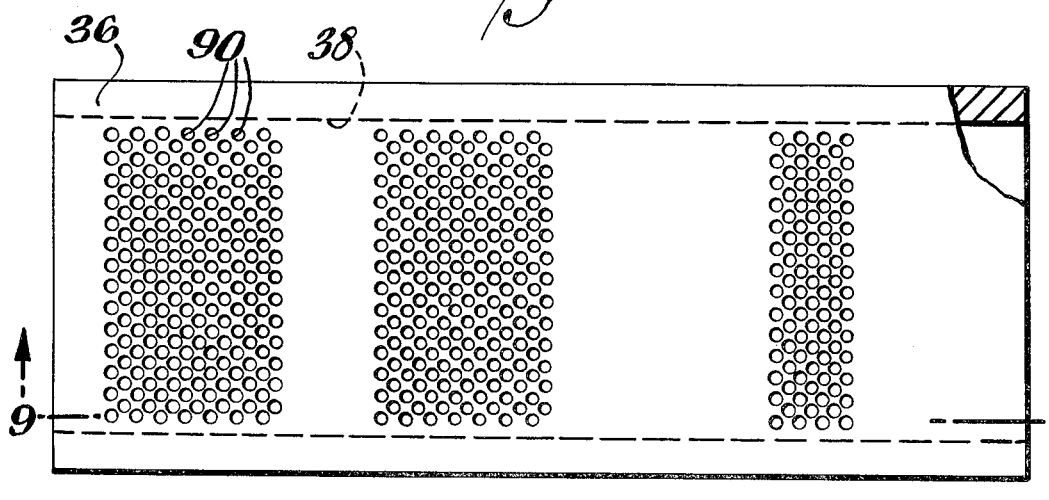
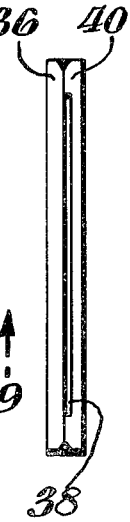
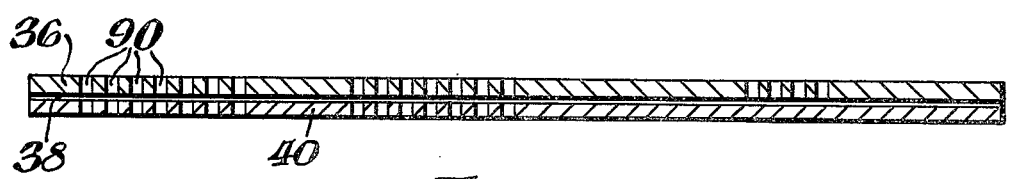

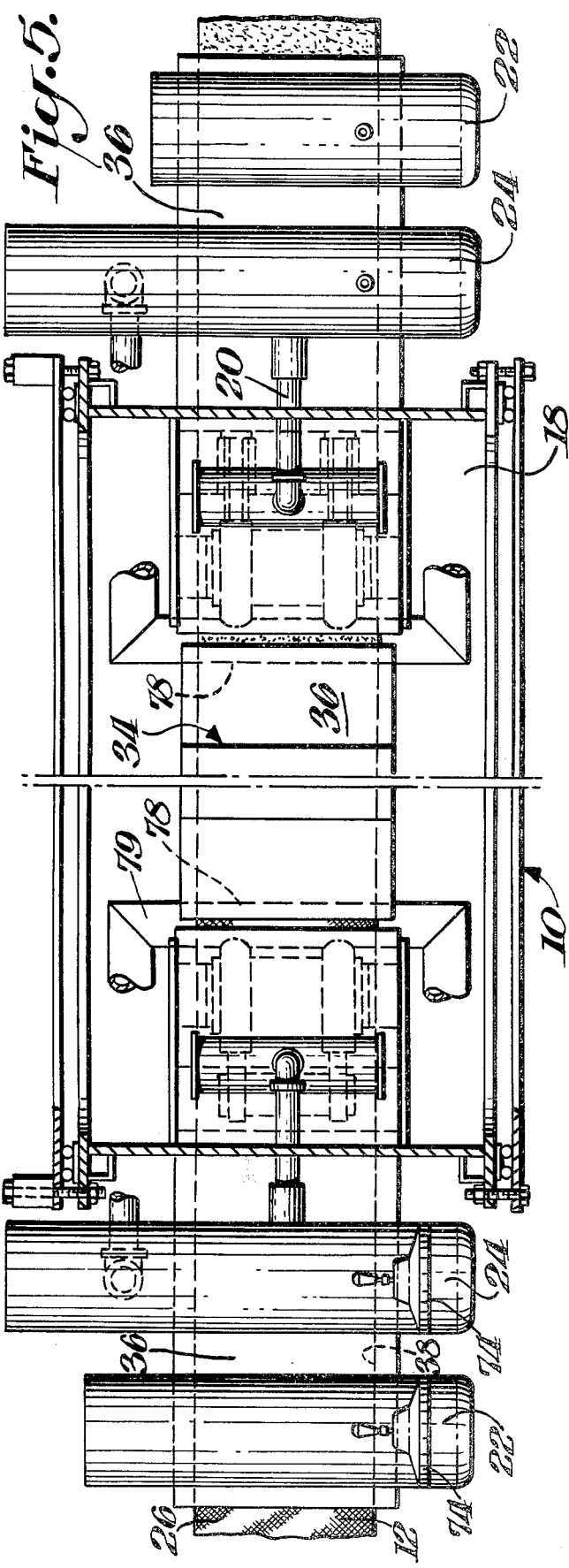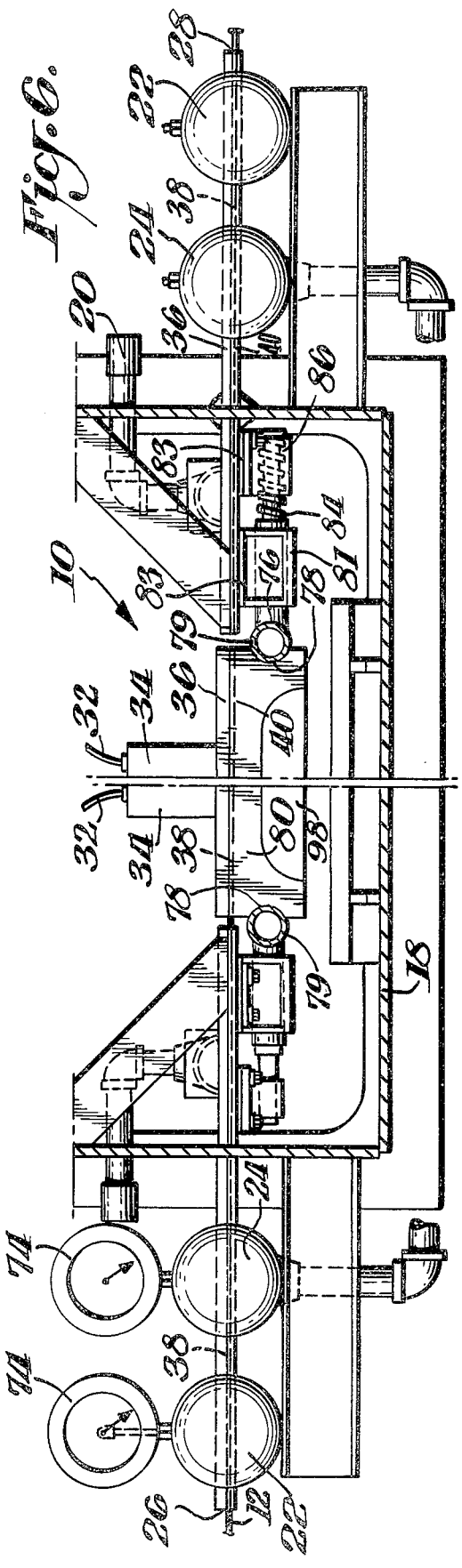

METHOD FOR VAPOR DEPOSITING PYROLYTIC CARBON ON POROUS SHEETS OF CARBON MATERIAL

BACKGROUND OF THE INVENTION

Sheets of carbon infiltrated with pyrolytic graphite are very useful as electrodes in fuel cells. These infiltrated sheets have heretofore been individually infiltrated in batches. An object of this invention is to provide an effective method and apparatus for making continuous vapor deposits of pyrolytic graphite on porous carbon sheets of fibrous material.

SUMMARY

In accordance with this invention, an elongated sheet of porous fibrous carbon is infiltrated with pyrolytic graphite by longitudinally traversing it through a treating zone where it is heated to a relatively high temperature capable of depositing pyrolytic graphite from a hydrocarbon gas. The treating zone is maintained at a subatmospheric pressure, and a flow of hydrocarbon gas is impinged on the sheet at a relatively high velocity through a number of substantially narrow flow streams. This deposits pyrolytic graphite on the sheet without obstructing the flow of streams. Advantageous deposits are obtained by traversing the sheets at speeds ranging from about 60–3600 ft. per hour through a heating zone maintained at a temperature of from about 2000°–2400°C and at a subatmospheric pressure ranging from about 3–20 mm. of Hg.

Clogging of the carbon depositing flow streams is avoided by maintaining their velocity at speeds ranging from about 20 to 200 (STP) ft. per min. The elongated sheet can be divided up into smaller sheets after passage through the treating zone. The required subatmospheric pressure in the treating zone is facilitated by maintaining auxiliary zones on both sides of the treating zone at subatmospheric pressures ranging from about 5–760 mm. of Hg. and most effectively by the use of tandem subatmospheric auxiliary zones having outer tandem zones ranging from about 760–70 mm. of Hg. and inner tandem auxiliary zones ranging from about 70–5 mm. of Hg.

A highly effective apparatus for the continuous vapor deposition of pyrolytic graphite on porous fibrous sheets of carbon material includes a subatmospheric chamber within which the elongated sheet is longitudinally traversed in a narrow slot between a pair of elongated guide plates. A number of flow passages through the guide plates intersect the slot to impinge a relatively high velocity flow of hydrocarbon gas on the sheet passing through it. The lower plate and indirectly the sheet are heated to the deposition temperature by passing an electrical current through the lower plate. The flow of gas through the many narrow flow passages in the guide plates cools them and concentrates the deposition of pyrolytic graphite on the heated sheets. This prevents the flow passages from being clogged with deposited graphite. The treating chamber is maintained at a subatmospheric pressure from about 3–20 mm. of Hg. and tandem pairs of subatmospheric antechambers may be disposed on both ends of the subatmospheric chamber to help maintain the subatmospheric pressure in it. A cutter may be disposed at the end of the apparatus to cut the elongated sheet into a number of individual sheets. A slot about 40 mils thick can suitably accommodate a pair of 13 mil. thick sheets. The guide plates may effectively be provided by ported blocks of polycrystalline graphite with which entrance and exit tubes may be aligned.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a diagrammatic view in elevation of a continuous carbon vapor depositing apparatus which is one embodiment of this invention;

FIG. 2 is a diagrammatic view in elevation showing the manner in which pyrolytic graphite deposits on a fiber during the operation of this invention;

FIG. 5 is a cross-sectional view taken through FIG. 4 along the line 5—5;

FIG. 6 is a cross-sectional view taken through FIG. 3 along the line 6—6;

FIG. 7 is a top plan view of the guide plates used in the apparatus shown in FIGS. 5 and 6;

FIG. 8 is an end view of the guide plates shown in FIG. 7;

FIG. 9 is a cross-sectional view taken through FIG. 7 along the line 9—9;

In FIG. 1 is shown a continuous carbon vapor depositing apparatus 10 for infiltrating an elongated sheet 12 of porous fibrous carbon with pyrolytic graphite. Pyrolytic graphite is anisotropic graphite, which is deposited at high temperatures from a hydrocarbon gas. The basal planes are randomly stacked, which causes a marked directional difference in physical, thermal and electrical properties. A principal anisotropic property is thermal conductivity in the planar direction similar to copper, whereas, it is an execllent insulator similar to a phenolic plastic in the direction through the thickness.

Figure 3:
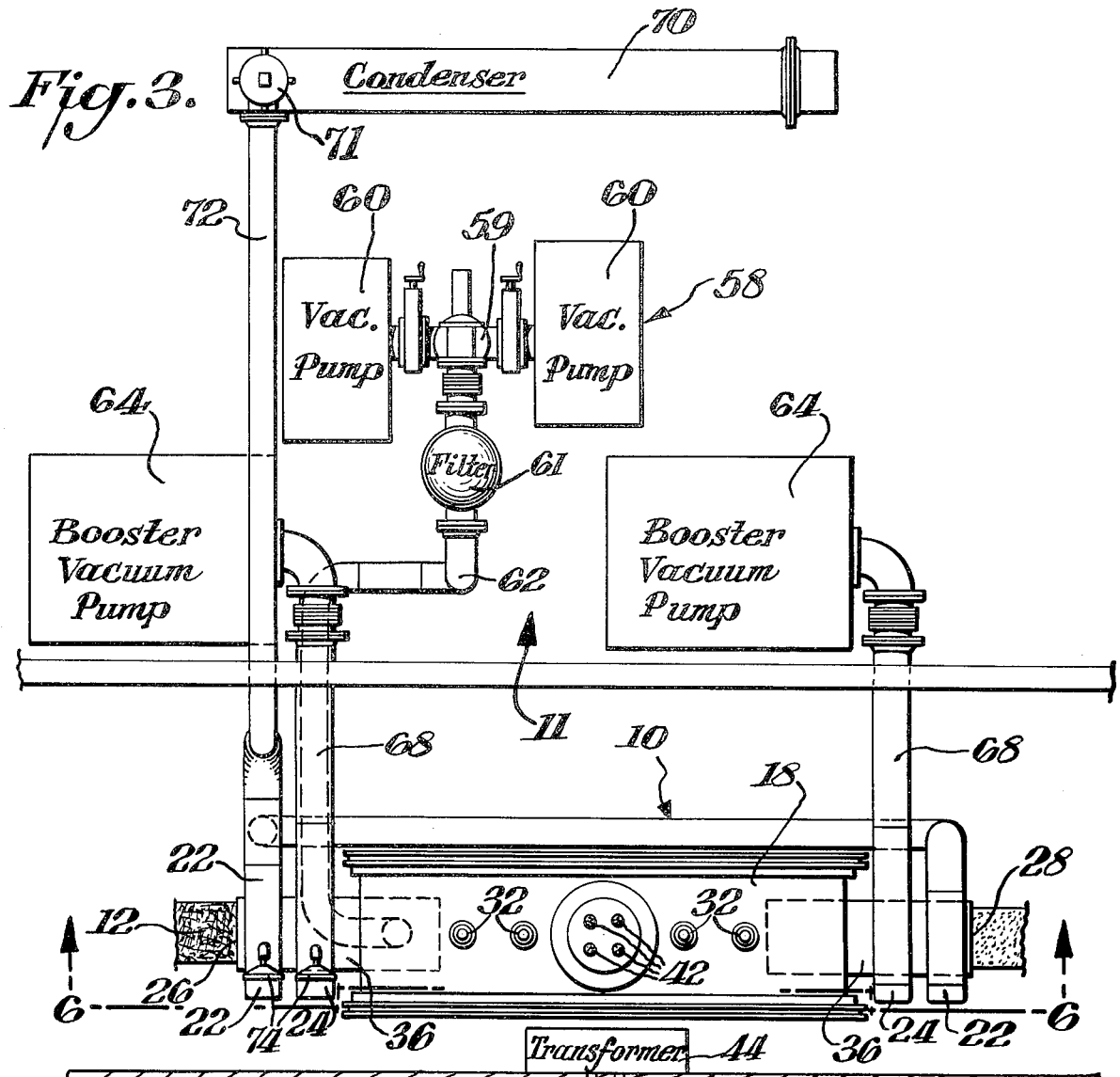
FIG. 3 is a top plan view of a continuous carbon vapor depositing apparatus and auxiliary equipment.

Sheet 12 supplied between feed rolls 14 is for example a carbon or graphite material, such as; a paper of matted graphite fibers; a woven graphite cloth or carbonized cellulosic paper. After the porous fibrous carbon material is infiltrated with pyrolytic graphite in apparatus 10, it is extremely well adapted for use as an electrode in a fuel cell, such as oxygen-hydrogen fuel cell like those used in stationary fuel cells.

Sheet 12 is, for example, a pair of continuous elongated sheets of porous fibrous graphite, each about 13 mils thick. Sheet 12 also may be a single thickness about 26 mils thick and about 8 to 13 inches wide. The ultimate infiltrated material will have an electrical resistivity of less than 0.02 ohm-cm, porosity of 60–80% and a mean pore diameter of about 60 microns.

Sheet 12 is infiltrated in a treating zone 16 within subatmospheric pressure chamber 18, which is maintained by drawing a vacuum through vacuum service equipment 58 (later described). A pair of tandem vacuum plenums or antechambers 22 and 24 on both ends of chamber 18 help maintain the subatmospheric pressure in the chamber as the sheet is continuously fed into and out of it through entrance throat 26 and exit throat 28. Safety seals 20 are supplied with an inert gas, such a nitrogen, in an emergency, if the seal on the system should be lost, to prevent air from rushing into the hot zone.

Main subatmospheric chamber 18 is maintained about from 3–70 mm. of Hg. and outer auxiliary vacuum plenums or antechambers 22 are maintained at a subatmospheric pressure ranging from about 760–70 mm. of Hg. Inner vacuum plenums or antechambers 24 are maintained at about 70–3 mm. of Hg. The subatmospheric pressure reduces hydrocarbon molecular collisions and minimizes sooting.

Hydrocarbon gas is supplied in the direction of arrows 30 to chamber 18 through supply tubes 32 leading to distributing chambers 34 connected above upper perforated guide plate 36 (later described). The hydrocarbon gas is for example comprised of acetylene, natural gas, methane, or the like supplied at a rate of about 4–100 C.F.M. and preferably at about 40 c.f.m. The supplied gas can also include diluents such as hydrogen, nitrogen, ammonia, argon, etc., and mixtures thereof.

Guide plate 36 helps form a guide slot 38 for longitudinal traversal by sheet 12 in conjunction with lower perforated guide plate 40 (also later described). Lower guide plate 40 is heated by current from electrical power cables 88 connected and supplied through transformer 44 to provide heat to slot 38 and sheet 12 passing through it. Chamber 18 is accordingly maintained at a pyrolytic graphite depositing temperature of from about 2000°–2400°C perferably at about 2200°C.

After passage through chamber 18 and auxiliary vacuum plenums 24 and 22, sheet 12 is divided into a number of separate sheets 12A by cutter 46 operated by a suitable prime mover 48.

FIG. 2 illustrates the manner in which pyrolytic carbon deposits 50 are made on a fiber 52 within sheet material 12 when hydrocarbon gas impinges upon it in the direction of arrow 54, which designates the direction of flow of gas. It is believed that the distortion of carbon deposit is caused by the presence of eddy currents simulated by curved arrow 56 in back of fiber 52, which creates a low pressure area in back of fiber 52 in which the carbon deposits predominate. The downstream distortion of carbon deposit 50 does not interfere with the operation of sheets 12A as suitable fuel cell electrodes.

Figure 4:
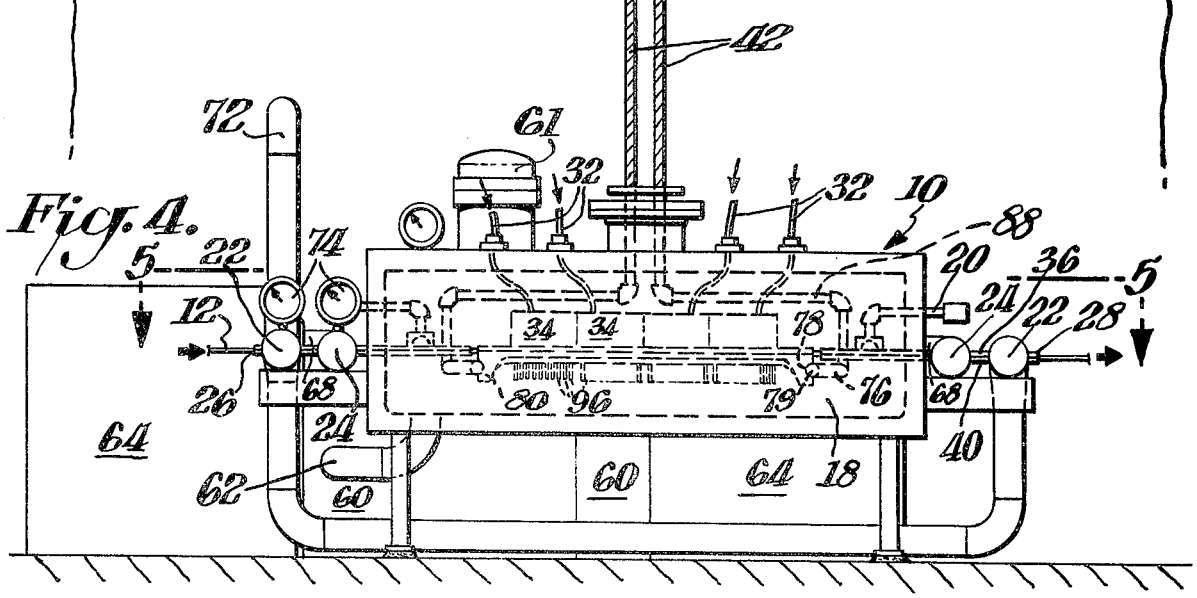
FIG. 4 is a front view in elevation of the apparatus and equipment shown in FIG. 3.

FIGS. 3 and 4 show a suitable arrangement of auxilary apparatus 11, including vacuum equipment 58 which includes main vacuum pumps 60 connected to chamber 18 through valve manifold 59, filter 61 and main conduit 62. Two booster vacuum pumps 64 also included. Booster vacuum pumps 64 are each connected to inner tandem vacuum chambers 24 by conduits 68. Outer tandem vacuum plenums 22 are connected to condenser 70 through conduit 72. Condenser 70 condenses the exhaust of the steam evactor 71 in the vacuum system and removes it from the system.

FIGS. 5 and 6 show additional details of chamber 18 and included equipment. Entrance and exit throats 26 and 28 are formed by a spaced pair of steel plates joined at their sides to form the out portions of guide slot 38 through which sheet 12 is traversed. The subatmospheric pressures in auxiliary subatmospheric antechambers or plenums 22 and 24 are read on gauges 74 connected to them. Guide throats 26 and 28 also extend within chamber 18 close up to the treating portion of guide slot 38 formed between upper guide plate 36 and lower guide plate 40. Plates 36 and 40 are made, for example, of polycrystalline graphite, which is temperature resistant and capable of acting as an electrical resistance element for heating slot 38 and sheet 12 within it. Electrical current is conducted to the portion of lower plate 40 disposed over lower bridge 80 through hollow contact rods 79, which are forcefully pressed against accurate recesses 78 in the ends of lower bridge 80. Rods 79 are forced against recesses 78 by support rods 76, which are inserted through brackets 81, which are insulated from the bottom of the outer section of lower plate 40 by a sheet of insulating material 83, such as a phenolic plastic. Spring 84 reacts between the end of support rod 76 and hollow spring retainer 86, which is also mounted below outer section of lower plate 40 and insulated from it by a sheet of phenolic material 83. As shown in FIG. 4, electrical current supplied through cables 42 and electrical conduits 88 is connected to the aforementioned electrical heating assembly by the connection of electrical conduits 88 to support rods 76 by direct or indirect connections. Support rod 76 and contact rod 79 are made of water-cooled copper tubing. The structure which forms slot 38 can also be heated by any other suitable heating means, such as electrical induction heating.

FIGS. 7–9 show flow ports 90 through upper guide plate 36 and lower guide plate 40 for directing the flow of hydrocarbon gas against sheet 12 passing within slot 38 between plates 36 and 40. Ports 90 are, for example, about ½inch in diameter. In the illustrated apparatus plates 36 and 40 are about 6 ft. long and approximately 378 ports are provided through them. Plates 36 and 40 are about 1½ ft. wide and slot 38 is about 40 mils. thick or deep and about 14½ inches wide to accommodate sheets up to about 13 inches wide.

Figure 10:
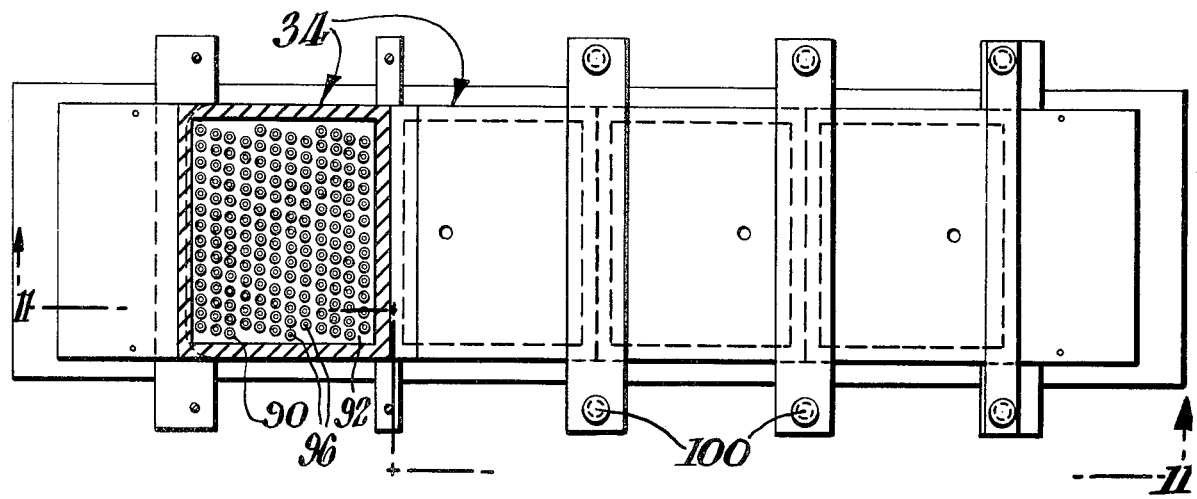
FIG. 10 is a top plan view of parts inside the subatmospheric chamber of the apparatus shown in FIGS. 5 and 6.
Figure 11:
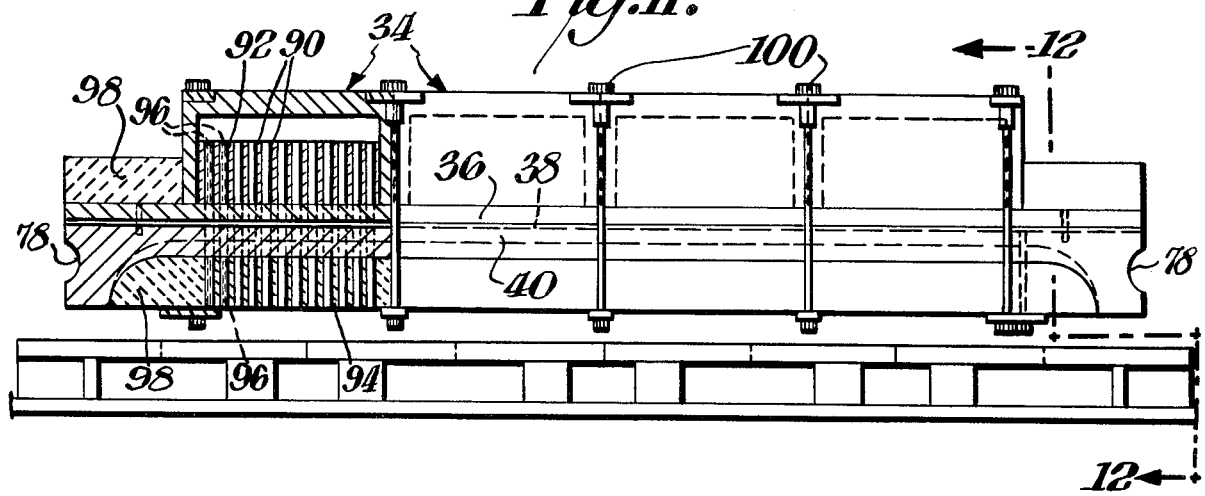
FIG. 11 is a cross-sectional view taken through FIG. 10 along the line 11—11.
Figure 12:
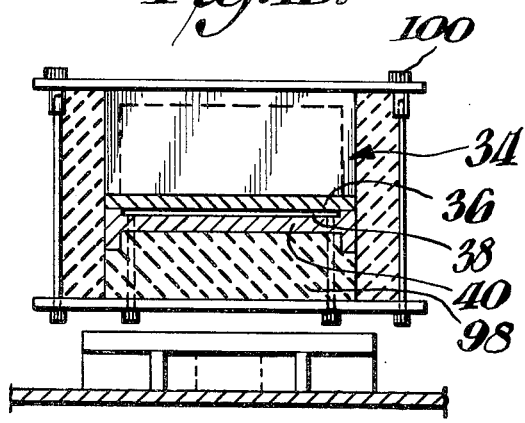
FIG. 12 is a cross-sectional view taken through FIG. 11 along the line 12—12.

FIGS. 10–12 show additional internal details within chamber 18 including distributing chambers 34 whose walls are made of polycrystalline graphite. Four distributing chambers 34 are provided. Within each of chambers 34 are provided channeled blocks 92 including flow passages 96 corresponding to each of ports 90 and aligned therewith. Flow passages 96 form relatively narrow or substantially restricted flow passages for directing hydrocarbon gas into and out of contact with sheet 12. A flow of hydrocarbon gas at a rate from about 5–20 cfm. to the overall apparatus provides relatively high velocities of flow within flow passages 96 and ports 90 aligned therewith of from about 20 to 200 (STP) ft. per minute. This relatively high velocity through passages 96 and ports 90 substantially cools the walls of the passages, which are also made of polycrystalline graphite, to prevent the graphite from depositing out on the walls of flow passages 96 and clogging them before the gas impinges on sheet 12. A similar block 94 is disposed under lower guide plate 40 in alignment with upper channeled block 92 with its passageways 96 in alignment with upper passageways having the same reference number. Lower channeled manifold 94 directs the gas away from sheet 12 after it has impinged upon it and deposits pyrolytic carbon on fibers 52 of sheet 12. As previously described, the exhausted and carbon-depleted gas is removed through the vacuum system. Auxiliary insulating blocks 98 are provided around chamber 18 to complete its structure.

Through bolts 100 help connect the parts of chamber 18 together.

The rate and amount of the pyrolytic graphite deposit are controlled by: temperature of the sheet, velocity of the hydrocarbon gas, concentration of hydrocarbon in the gas and pressure of the gas. The gas is delivered through the tubes fast enough to prevent it from depositing on the walls of the tube, and the graphite deposits upon the hot porous fibrous sheet 12. The high velocity through the tubes unexpectedly prevents clogging them up by deposits of graphite and the impingement of the gas on the solid portions of the porous mat forms turbulent zones in back of the fibers in which the carbon deposits relatively quickly. Graphite deposits are, therefore, built up on the back sides of the carbon filaments, whereas the tubes do not collect appreciable amounts of carbon. This might be helped by the cooling effect of the rapidly flowing hydrocarbon gas. The high vacuum in chamber 18 prevents sooting caused by collisions of hydrocarbon molecules. Sooting can also be prevented by diluting the hydrocarbon gas with a gas like argon, hydrogen, ammonia, nitrogen or mixtures thereof.

I claim:

1. A method of infiltrating a sheet of porous fibrous carbon with pyrolytic graphite comprising the steps of traversing an elongated sheet of porous fibrous carbon in a longitudinal path of travel, drawing a subatmospheric pressure in a treating zone in said path to reduce sooting, heating the sheet in the treating zone to a pyrolytic carbon-deposition temperature, impinging relatively narrow flow streams of hydrocarbon gas upon the heated sheet in the treating zone through a number of substantially restricted flow channels directed at the sheet to cause the gas to flow at a velocity of from about 20 to about 200 (STP) feet per minute whereby a deposit of pyrolytic graphite is infiltrated on the sheet without substantially obstructing the flow channels.

2. A method as set forth in claim 1 wherein the sheet is traversed at a speed of from about 60 to 3600 feet per hour.

3. A method as set forth in claim 1 wherein the subatmospheric pressure ranges from about 3 to 20 mm. of Hg.

4. A method as set forth in claim 1 wherein the deposition temperature ranges from about 2000° to 2400°C.

5. A method as set forth in claim 1 wherein the deposition temperature is about 2200°C.

6. A method as set forth in claim 1 wherein a density of deposit from about 10 to 30 grams of pyrolytic carbon per square mater is infiltrated on the sheet.

7. A method as set forth in claim 1, wherein the elongated sheet is cut up into smaller sheets after passing through the treating zone.

8. A method as set forth in claim 1, wherein the sheet of porous fibrous carbon is treated while it is passed through a slot between a pair of blocks of polycrystalline carbon and an electrical current is passed through one of the blocks to heat it and the porous sheet of fibrous carbon.

9. A method as set forth in claim 1 wherein the subatmospheric pressure in the zone is approximately 4 to 8 mm. of Hg.

10. A method as set forth in claim 1 wherein auxiliary subatmospheric zones are disposed on both ends of the treating zone, and a subatmospheric pressure of from about 760–5 mm. of Hg. is maintained in the auxiliary zones.

11. A method as set forth in claim 10 wherein each of the auxiliary zones are comprised of a pair of tandem auxiliary zones, the outer of the tandem auxiliary zones being maintained at a subatmospheric pressure of from about 760–70 mm. of Hg., and the inner of the tandem auxiliary zones being maintained at a subatmospheric pressure of from about 70–5 mm. of Hg.

* * * * *